July 12, 1966    J. M. BOOE    3,260,904
ELECTRICAL CAPACITOR HAVING AN OXIDE DIELECTRIC
AND A COOPERATING DIELECTRIC MATERIAL
Filed Aug. 21, 1963    2 Sheets-Sheet 1

INVENTOR.
JAMES M. BOOE
BY
ATTORNEY

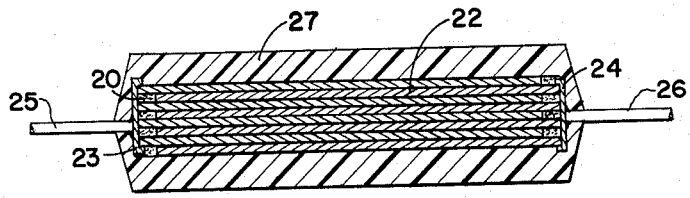
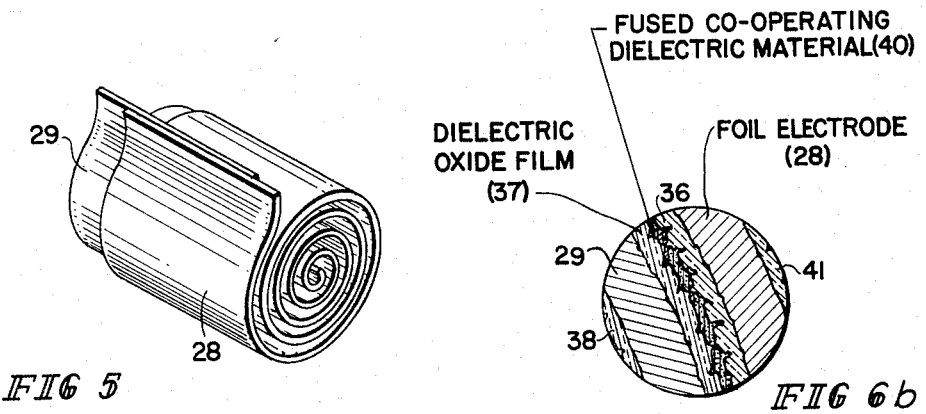
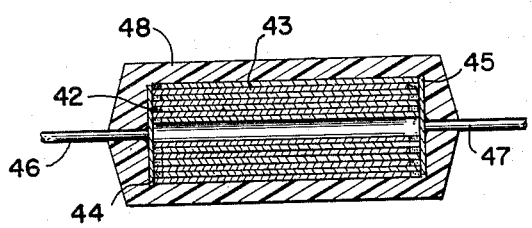
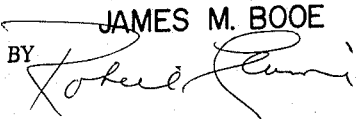

3,260,904
Patented July 12, 1966

3,260,904
ELECTRICAL CAPACITOR HAVING AN OXIDE DIELECTRIC AND A COOPERATING DIELECTRIC MATERIAL
James M. Booe, Indianapolis, Ind., assignor to P. R. Mallory & Co., Inc., Indianapolis, Ind., a corporation of Delaware
Filed Aug. 21, 1963, Ser. No. 303,619
2 Claims. (Cl. 317—258)

This invention relates to electrical capacitors and has specific pertinence to the means and methods for improving the dielectric oxide film on electrodes of nonelectrolytic capacitors.

There is a group of metals including aluminum, tantalum, niobium, hafnium and zirconium, termed film-forming metals, whose oxides are known to be excellent dielectric materials well suited for use in capacitors. Dielectric oxide films may be readily produced on the surface of such film-forming metals by means of conventional electrolytic anodization techniques. Almost invariably, however, such oxide films are possessed of minute imperfections and irregularities which reduce the dielectric qualities in a capacitor application. These microscopic imperfections reduce the dielectric strength, reduce the insulation resistance, allow current leakage, and lower the breakdown level of the capacitor.

It is well known in the capacitor art that an electrolyte may be introduced to alleviate the undesirable electrical effects caused by the imperfect dielectric oxide film on the capacitor electrode. The function of the electrolyte therein is to heal or rebuild any discontinuities in the dielectric oxide film which are either present initially, or which subsequently occur during capacitor operation. Anodized electrodes of a film-forming metal, therefore, are most generally used in combination with an electrolyte to produce electrolytic capacitors.

The nature and causes of imperfections in the dielectric oxide film are many and varied. One type of imperfection originates from impurity centers in the metal electrodes which fail to take an anodic film, thus leaving a hole in the oxide. There are other types of impurity centers in the electrode material which, although soluble in the electrolyte, give rise to an abnormal anodic film. Moreover, an inherent source of discontinuities in the anodic film is attributable to the grain boundaries of the electrode metal.

It has further been found that minute or microscopic foreign particles on the surface of the metal electrode or the oxide film may cause potential points of low dielectric breakdown. When heavy anodic films are employed, the inherent porosity thereof results in somewhat inferior dielectric properties. Anodic films, particularly the heavy porous types, retain ions of the electroformation solution which are different to remove. Also, in the anodization of aluminum with certain electrolytes such as sulfuric acid, an appreciable amount of basic aluminum sulfate is known to be retained in the film and cannot be removed by presently known methods without destroying the oxide layer.

Attempts to utilize the dielectric oxide surfaces of film-forming metals as electrodes in non-electrolytic capacitors have heretofore been generally limited to those cases where the operating voltage is relatively low. The principal difficulty has been the breakdown of the dielectric oxide film due to its numerous imperfections. Even in making the low voltage units, it is necessary to resort to anodic etch as a means of removing impurity centers in the oxide film and in the metal surface, after which reanodization is required. The use of high purity metal foil, polishing of the foil surfaces, and careful control of the anodization process are not sufficient measures to produce a dielectric oxide film free of discontinuities. Hence, the success of such a "dry" oxide film capacitor depends primarily on a practical and effective means of overcoming the oxide film imperfections during construction of the capacitor unit. There are other considerations, however, which attend the use of oxide film capacitors. For example, in the fabrication and handling of the units, the film may be subjected to bending, abrasion, and thermal processing effects. Cracks and fissures in the oxide film may result therefrom, and such effects must be overcome.

It is highly desirable, therefore, to develop a dielectric oxide film capacitor having a nearly perfect film. Such a device would have substantial disadvantages with respect to high capacitance per unit volume, high operating temperature capability, high insulation resistance, low dissipation factor, low thermal coefficient of capacitance, and the freedom from use of liquid electrolytes with their attendant troublesome features. Furthermore, the oxide film would serve the dual purpose of affording physical separation of the metal electrodes in the stacked or wound foil construction, as well as comprising the capacitor dielectric therein.

Accordingly, in the present invention there is disclosed the means and method for providing a non-electrolytic capacitor having a nearly perfect dielectric film on metal foil electrodes. It will be shown that the capacitor of this invention can withstand operating voltages far in excess of the 500 volt maximum obtainable with the aluminum electrolytic type. This voltage capability of the composite dielectric film employed herein stems largely from the addition of certain cooperating dielectric materials in a manner which overcomes the characteristic imperfections in the dielectric oxide film. The co-operating dielectric materials disclosed in the present invention can be generated onto a defective dielectric oxide film and, in certain cases, integrated therewith by melting, pressing and hardening. By a controlled technique to be hereinafter described, it has become possible to introduce an extremely thin coating of the co-operating dielectric material in a manner which will greatly enhance the electrical properties of the composite dielectric without materially increasing the electrode spacing. If the co-operating dielectric material fuses to the oxide layer, it serves a two-fold purpose, viz., as a dielectric filler and as a binder between the adjacent capacitor foil electrodes.

The co-operating dielectric material may be introduced in solid, liquid or gaseous form. Numerous solid materials have been employed herein as co-operating dielectrics, some as chemical elements and some as organic and inorganic compounds. The solid material may be prepared in any suitable form such as granulated particles, as a cast film, as a deposited film, etc. In every case, the basic objective is to produce a high quality composite dielectric film of low dissipation factor in order to avoid energy loss and excessive heat generation which would cause undue shortening of capacitor life, and premature voltage breakdown. Desirable characteristics of such a co-operating dielectric material would include a high dielectric constant, high resistivity, high melting and boiling points, good flowability, ability to fuse to the dielectric oxide film, non-reactivity with the electrode metal, stability at elevated temperatures, low cost, low moisture absorption, resistance to decomposition, and high dielectric strength. Test results will be presented later in this specification to illustrate the marked increase in capacitor performance brought about by improvement of a dielectric oxide film through the introduction of co-operating dielectric material.

It is an object of the present invention, therefore, to provide a non-electrolytic oxide film capacitor having performance characteristics substantially superior to that of the contemporary electrostatic capacitor.

It is a further object of the present invention to provide the means and method for overcoming the imperfect nature of a dielectric oxide film by introducing a cooperating dielectric material into the interstices created by the defective film.

A further object of the present invention is to disclose solid, gaseous, and liquid materials suitable for use as a co-operating dielectric medium.

A further object of the present invention is to produce a non-electrolytic oxide film capacitor wherein a fusible co-operating dielectric material is integrated with the dielectric oxide filmed on adjacent foil electrodes, thereby serving as a foil binder as well as a dielectric filler.

Another object of the present invention is to produce a non-electrolytic oxide film capacitor having many of the performance advantages of the electrolytic capacitor, but without the disadvantages caused by the presence of liquid electrolytes.

Still another object of the present invention is to show the adaptability of a wide variety of solid materials for use as co-operating dielectrics.

Yet another object of the present invention is to provide a non-electrolytic oxide film capacitor having substantial advantages with respect to high capacitance per unit volume, high insulation resistance, high operating temperature capability, low dissipation factor, and low thermal coefficient of capacitance.

Still another object of the present invention is to provide a non-electrolytic oxide film capacitor having a reasonably high breakdown voltage.

Still another object of the present invention is to provide a non-electrolytic oxide film capacitor wherein there is no ionic transfer which can produce physical and chemical changes during the operational lifetime. An inherent potential for instability is thereby eliminated.

Yet another object of the present invention is to disclose two embodiments of a non-electrolytic oxide film capacitor of high capacitance per unit volume, one employing a wound foil construction and the other employing a stacked foil construction.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the present invention and the nature thereof will become apparent from the following description considered in connection with the accompanying figures of the drawing and wherein like reference characters describe elements of similar function therein, and wherein the scope of the invention is determined rather from the dependent claims.

In the drawings:

FIGURE 4 is a sectional view of an encapsulated embodiment of an eight-foil capacitor stack constructed according to the teachings of the present invention.

FIGURE 5 is a perspective view of two spirally wound foil electrodes in a condition prior to melting, pressing, and fusion of the co-operating dielectric material. In this construction, the co-operating dielectric may be inserted between the foils in a cast film sheet form, or may be actually deposited thereon as an adherent film.

FIGURE 6 is a schematic view of an apparatus for progressively forming a wound foil capacitor wherein the co-operating dielectric material is continually supplied to the dielectric oxide surfaces, and wherein melting, pressing, and fusion occur during rolling.

FIGURE 6a is a magnified view illustrating the relative foil spacing in FIGURE 6 and the nature of the respective layers prior to melting, pressing, and fusion of the co-operating dielectric material.

FIGURE 6b is a magnified view illustrating the relative foil spacing in FIGURE 6 and the nature of the respective layers after melting, pressing, and fusion of the co-operating dielectric material has taken place.

FIGURE 7 is a sectional view of an encapsulated embodiment of a two-foil wound capacitor constructed according to the teachings of the present invention.

Figure 1:
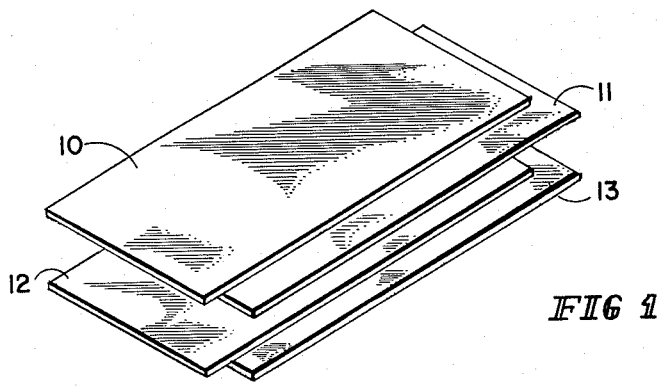
FIGURE 1 is a perspective view of four typical foil electrodes for use in the stacked foil construction, with the thickness exaggerated for purposes of clarity. The foils are anodized on both faces, but the co-operating dielectric material has not been applied thereto.

Generally speaking, the present invention discloses a non-electrolytic capacitor employing a dielectric oxide layer grown on the surface of a film-forming metal electrode, and wherein the imperfections inherent in the oxide layer are remedied by the addition or integration of a co-operating dielectric material thereupon. In this manner, it has become possible to produce an oxide film capacitor of the dry type having many of the performance advantages of the electrolytic capacitor, and having qualities substantially superior to the contemporary electrostatic capacitor.

As hereinbefore mentioned, the oxide layers grown on film-forming metals such as aluminum, tantalum, and niobium, are known to exhibit excellent dielectric properties. For example, aluminum oxide has a dielectric constant of about 9, and tantalum oxide has a dielectric constant of approximately 26. The main difficulty associated with the use of such films, however, is in maintaining the dielectric strength so as to enable operation at appreciable voltage stress without breakdown. If an electrolyte is not introduced for the purpose of healing the oxide film irregularities, any improvement in capacitor working life is most likely to be brought about by means of some basic refinements in dielectric quality.

Anodic coatings may be formed by electrolytic anodization techniques under a wide variety of forming conditions, resulting in behavior characteristics of wide variance. Anodic oxide coatings are generally classified as either porous or nonporous. This, in turn, depends upon whether the forming electrolyte exerts an appreciable solvent action on the oxide during formation. In electrolytes that possess little or no ability to dissolve the oxide, the coatings are thin and nonporous. If the electrolyte has an appreciable solvent action, pores are developed during formation of the oxide, and the porous type of coating is produced. This latter type coating is characterized by a thin nonporous layer of oxide next to the metal and a relatively thick porous layer of oxide situated thereabove.

Much information is available on the art of electroformation of aluminum oxide. Nonporous coatings may be electrolytically formed using an aqueous solution of a borate or boric acid, a citrate, succinate, or a tartrate. It has been found that a high current flows initially therein, and aluminum oxide is formed rapidly. However, after a relatively short time, current flow decreases to a low, steady value and the coating is completely formed. Film thickness is a function of applied voltage at a rate of approximately 14 Angstrom units per volt, and can be increased only by raising the applied voltage.

With porous coatings formed in electrolytes that exert appreciable solvent action on the oxide, however, a relatively high, steady current flow and continued coating growth are observed. Porous oxide coatings may be formed on aluminum by using electrolytes such as oxalic, sulfuric, phosphoric, or chromic acids. Because these electrolytes create a solvent action on aluminum oxide, the oxide layer will continue to grow with time, resulting in relatively thick films. The amount of oxide formed herein is generally a function of current and time, although the final thickness obtained is naturally reduced by the solvent action of the electrolyte, this action being most pronounced at or near the outer surface of the oxide layers. It is very desirable to follow the porous film development by the formation of a suitably thick nonporous film at the base of the porous film. This is in the nature of a "sealing" operation.

In the capacitor structure taught by the present invention, dielectric films of both porous and nonporous nature may be employed. For low operating voltage applications, e.g., up to 200 volts, the nonporous film has been found to be suitable. Whereas, in the case of operating voltages in the order of 1000 volts and breakdown voltages as high as 3000 volts, the porous oxide film is desirable. When a porous film is produced, however, it is extremely advantageous to follow this by the formation of a "barrier" or nonporous film at the base of the porous film. In either instance, the aluminum foil should be smooth and of extremely high purity, and the surface finish should be chemically or electrochemically polished prior to anodization. This operation has a twofold purpose, viz., to remove projections from the surface of the foil, and to remove impurities from the surface of the foil. By use of such polishing techniques, it has been found that leakage current through the dielectric oxide film decreases significantly and the breakdown voltage or dielectric strength increases accordingly.

Referring now to the drawings, two embodiments of the present invention are presented in detail. One embodiment comprises a stacked construction of numerous foil squares and the other comprises a convolutely wound assembly of two foil strips. FIGURE 1 shows a group of four rectangular foil electrodes arranged for a stacked assembly. The illustrated foil thickness is exaggerated for clarity, the preferred size range being approximately .0005 inch to .003 inch. In such an assembly, the foils are positioned so that electrodes 10 and 12 protrude from one edge, and counter-electrodes 11 and 13 protrude from the opposite edge. This staggered arrangement provides for attachment and termination of the two sets of electrodes.

The foil electrodes of FIGURE 1 are composed of a film-forming metal of high purity and smooth surface. Aluminum foil of 99.99% purity has produced favorable results herein, although the concept of this invention is not limited to aluminum. Tantalum and niobium are excellent electrode alternatives. Prior to anodization, the foil surfaces are cleaned and polished by chemical or electrochemical means to obtain optimum surface finish. The foil electrodes are then rinsed in preparation for anodic treatment.

For capacitors having higher voltage requirements, the foil may be initially anodized to form a porous dielectric oxide film. Using a 0.7% axolic acid electrolyte solution at 20° C., for example, the anodization time for aluminum foil may be approximately 18 minutes at a cell voltage of 65 volts D.C., and a curent density of 0.01 amps per square centimeter. To "seal" the porous film thus formed, further anodization may be carried out according to techniques which produce a nonporous film. As an example of the latter step, in a 10% boric acid electrolyte solution at 100° C., the anodization time may be 30 minutes at a cell voltage of 400 volts D.C.

Following electroformation, the anodized foil electrodes are rinsed and dried. Thereupon, the electrodes are in condition for application of the co-operating dielectric material. As will be shown herein, the nature and type of the co-operating dielectric may vary widely. In one instance it may comprise a granular substance which is spread over the oxide surfaces in dry form. In another case it may be applied to the oxide surfaces as a film. For purposes of illustration in the drawings, a co-operating dielectric material in the form of a fine powder was employed. Very successful results have been obtained with organo-silicon compounds in powdered form. Specifically, the following four aryl-substituted silane compounds were used herein: Tetra-P-Biphenylylsilane, Diphenyldi-P - Biphenylylsilane, Triphenyl - P - Biphenylylsilane, and Phenyltri-P-Biphenylylsilane. These aryl silane compounds have high melting and boiling points are are very stable at elevated temperatures. The first compounds listed has a melting point of 280° C. and a boiling point of 600° C. Whereas, the average melting point of the three latter compounds is 160° C. with a boiling point of 555° C. All but the first compound exhibit good solubility in most organic solvents. The dielectric properties of this material make it very suitable for use as a co-operating dielectric in the present invention.

Figure 2A:
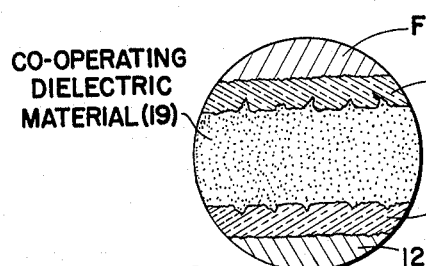
FIGURE 2a is a magnified view illustrating the relative foil spacing in FIGURE 2 and the nature of the respective layers prior to melting, pressing, and fusion of the co-operating dielectric material.
Figure 2:
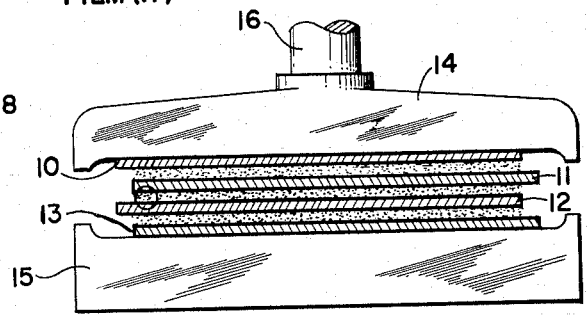
FIGURE 2 is an elevation view of the four foil electrodes of FIGURE 1 positioned between two platens prior to application of heat and pressure. A granulated co-operating dielectric material is shown dispersed between the foil surfaces.

Referring now to FIGURE 2 of the drawing, the foil electrodes of FIGURE 1 are shown positioned between platen members 14 and 15 with co-operating dielectric material dispersed in powder form between each foil. It is important that the working faces of the platen members be extremely smooth an parallel. Heat may be supplied to the platens for the purpose of softening and fusing the co-operating dielectric material. Mechanical pressure may then be applied to the foil stack by means of adapter member 16 affixed to upper platen member 14. It has been found very advantageous to employ a resilient member between one platen and the foil stack to serve as a pressure equalizer. Examples of suitable material for said resilient member are fluorocarbon elastomers, high temperature silicone rubber, neoprene, etc. It is also advantageous to conduct the hot pressing operation within a vacuum, thereby removing air and moisture.

FIGURE 2 is intended to illustrate the foil spacing prior to melting and integration of the co-operating dielectric with the oxide dielectric layer. To more clearly represent the nature of the foil spacing, FIGURE 2a was constructed from a typical area between electrodes 11 and 12, and thereupon magnified. Referring now to FIGURE 2a, the lower portion of foil electrode 11 is seen with dielectric oxide film 17 formed thereon. Similarly, the upper portion of foil electrode 12 is shown with dielectric oxide film 18 formed thereupon. Between oxide films 17 and 18 is dispersed a powder-like quantity of co-operating dielectric material 19, herein an aryl silane compound. Typical imperfections and irregularities in the oxide film may be seen in this view. With respect to actual dimension, this view contemplates a foil electrode thickness of .003 inch, an oxide film thickness of .001 inch and a co-operating dielectric powder height of .003 inch.

Figure 3:
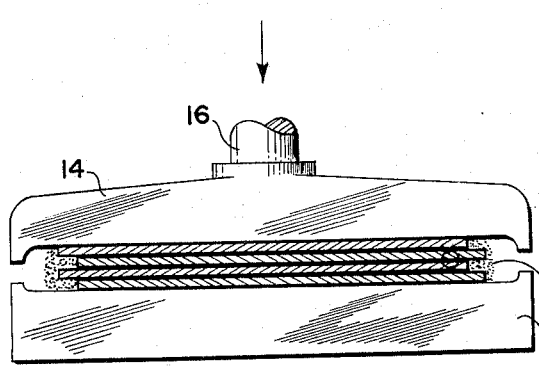
FIGURE 3 is an elevation view of the foil stack of FIGURE 2 after heat and pressure has been applied through the platen members. For best results, this operation should be carried out in a vacuum to remove air and moisture.

FIGURE 3 shows the same foil stack of FIGURE 2 after application of heat and pressure through platen members 14 and 15. The excess co-operating dielectric material 20, which is not integrated with the oxide dielectric films, is expelled to the edge of the electrode foils and allowed to cool into a glass-like mass. This mass serves as a spacer between the overhanging electrode edges. Referring now to the magnified view of FIGURE 3a, the co-operating dielectric material 21 has become integrated with oxide films 17 and 18, resulting in a glass-like bond which fills the surface imperfections. To assist in filling the interstices, it is preferable to conduct the hot pressing operation in a vacuum.

Figure 3A:
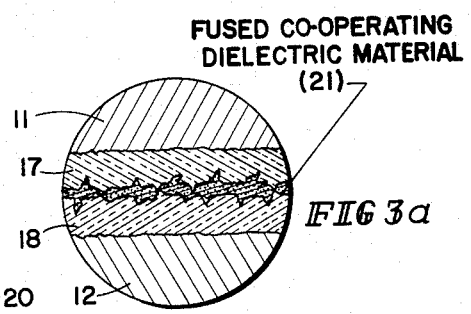
FIGURE 3a is a magnified view illustrating the relative foil spacing in FIGURE 3, and the nature of the respective layers after melting, pressing, and fusion of the co-operating dielectric material has taken place.

It is to be noted that the resulting increase in foil spacing caused by the addition of co-operating dielectric 21 is only negligible. The final amount of co-operating dielectric present depends obviously on the platen pressure, and to some extent on the type of material and the temperature during pressing. In the example of FIGURE 3a, the thickness of material 21 is approximately one-half that of the respective oxide films, or .0005 inch.

FIGURE 4 presents an encapsulated embodiment of the stacked foil assembly of FIGURE 3, with eight electrodes instead of four. The foil electrodes, shown typically at 22, are separated by the composite dielectric layer. To facilitate termination, the excess co-operating dielectric material 20 is removed from the electrode edges as necessary. The alternately spaced electrodes are grouped together and soldered at the respective ends by means of connectors 23 and 24. Terminal leads 25 and 26, respectively, are thereupon soldered to the electrode connectors. The capacitor assembly may then be suitably encapsulated, such as with plastic housing 27. In a preferred embodiment, the stacked foil assembly of FIGURE 3 may be housed in a hermetically sealed container.

With continued reference to FIGURE 4, it should be emphasized that all the foil electrodes need not have an oxide film on the surface. Although the oxide film is unanimously present in most high voltage applications, it may be desirable to provide only alternate electrodes with the oxide film for low voltages, with the remaining electrodes being bare aluminum or some other metal.

FIGURE 5 illustrates the basic arrangement for the wound foil capacitor embodiment of this invention. Two foil electrode strips 28 and 29 of determined length are prepared from a film-forming metal of high purity, and the foil surface is initially very smooth. Surface polishing, anodizing, rinsing, and drying steps are carried out by the techniques heretofore described. If the cooperating dielectric material can be deposited onto foil electrodes 28 and 29 as an adherent film, or inserted therebetween as a cast film sheet, the foil can then be spirally wound in the manner shown in FIGURE 5 prior to application of heat and radial pressure. A heated compression roller disposed parallel to the axis of the foil roll and in peripheral contact with said roll, can then be used to melt the co-operating dielectric while radially-inward pressure is applied to the foil. Note that the foils are staggered along their central axis so that, in the resulting roll, the edges of each foil will protrude for contact and termination.

An organic co-operating dielectric material which has been successfully used in the present invention as a deposited film is a cyanoethylated cellulose, proprietarily called "Cyanocel," and produced by the American Cyanamid Co. It is also available in the cast film form. Perhaps the outstanding feature of this material is its high dielectric constant ranging from 15 to 10 c.p.s. to 12 at 1 million c.p.s., at room temperature. Since aluminum oxide has a dielectric constant of approximately 9, the resulting constant of the composite dielectric will actually be increased if the anodized electrodes are aluminum. Another outstanding property of "Cyanocel" is its high dielectric breakdown strength of over 1000 volts per mil when used in the cast film condition. It has a reasonably high temperature resistance, having a flow temperature of about 200° C. under a pressure of 6000 p.s.i.

Although cyanoethylated cellulose is a fibrous material as produced, it is soluble in such organic solvents as acetone, acetonitrile, acrylonitrile, gamma butyrolactone, pyridine, and dimethyl formamide. If the anodized foil is coated with a solution of cyanoethylated cellulose and the solvent is allowed to evaporate, a deposited film will remain thereon as an ideal co-operating dielectric. Thereupon, with the application of heat and mechanical pressure, preferably in an evacuated atmosphere, the cellulose film will soften and fill the oxide layer imperfections. This technique is suitable for both the stacked foil and wound foil constructions, and affords distinct advantages with respect to ease of handling.

Although the drawings herein illustrate the co-operating dielectric material in powder form, it is to be recognized that, from a practical standpoint, this is not the optimum medium for convenience of handling. Where the co-operating dielectric material is powdered as in the case of the aryl silane compounds, it is preferable to apply it to the foils from a solution of the dielectric in a suitable solvent, after which the solvent is allowed to evaporate. In order to completely remove the solvent, however, it is often necessary to apply heat to the foil within a moderate vacuum.

FIGURE 6 of the drawing illustrates schematically an apparatus for producing a wound foil capacitor wherein the co-operating dielectric material is introduced while winding progresses. This method is advantageous in the case of co-operating dielectrics in powdered form, although it is equally well suited for cast film materials. Anodized foil strip electrodes 28 and 29 are anchored at one end to a drive spindle 30 which represents the central axis of the capacitor roll to be formed. The incoming lengths of electrodes 28 and 29 are tensioned by idler rollers 31 and 32. As the foil is introduced to the winding apparatus, the co-operating dielectric material is dispersed upon the upper surface of electrodes 28 and 29 at some point where the two electrodes are still separated. Thereafter, compression roller 33 applies a radiallly-inward force to squeeze the foil winding together. Heat to melt the co-operating dielectric material may be applied through roller 33 and/or through an R-F heating coil 34 energized by power source 35. A Teflon coating on roller 33 is effective for preventing adhesion and buildup thereon of excess dielectric which is expelled from the foil edges. Both compression roller 33 and heating coil 34 are radially adjustable to compensate for diameter changes in the foil roll.

The apparatus of FIGURE 6 is also useful for melting, pressing, and integrating a co-operating dielectric of the deposited film type. In that instance, the pre-formed roll of FIGURE 5 is continuously heated, rotated, and compressed until the required integration is accomplished. The feed-in applicator, of course, becomes unnecessary and the roll diameter diminishes somewhat instead of increasing. Because of the greatly reduced area of contact between compression roller 33 and the foil, as compared to the platen method, the localized pressure in the former instance can be substantially greater.

FIGURE 6a is a magnified view of the foil spacing prior to integration of the co-operating dielectric. The upper surface of foil electrode 28 has dielectric oxide film 36 formed thereon. Upon oxide film 36 is dispersed co-operating dielectric 39, herein illustrated in powdered form. Slightly separated therefrom is foil electrode 29 with its upper and lower oxide films 38 and 37, respectively. Co-operating dielectric 39 is also dispersed on upper oxide film 38 as a result of the feed-in application procedure.

As the freshly applied co-operating dielectric 39 is melted, compressed, and advanced into the winding roll, it fills the oxide imperfections, fuses thereto, and, in the case of the aryl silane compounds, hardens into a glass-like substance 40 upon cooling. FIGURE 6b presents a magnified view of this condition, showing improvement of oxide films 36 and 37.

FIGURE 7 presents an encapsulated embodiment of the wound foil assembly of FIGURE 6. The contacting and terminating procedures are substantially the same as described in connection with FIGURE 4.

The following three examples of test results will serve to illustrate the outstanding performance advantages attainable by use of a co-operating dielectric in the manner taught by the present invention. In each example, the co-operating dielectric material comprised one of the four aryl silane compounds previously described, and only two stacked-foil aluminum electrodes were employed in the capacitor construction. Examples 1 and 2 employed a porous and "sealed" anodic layer, while that of Example 3 was nonporous.

EXAMPLE 1

|  | Capacity (Micro-microfarads per Square Inch) | Dissipation Factor, Percent (at 1 kc.—Room Temp.) | Breakdown Voltage (D.C.) |
|---|---|---|---|
| With Co-Operating Dielectric | 6,000 | 0.4 | 1,000 |
| Without Co-Operating Dielectric | 6,000 | 3.0 | 500 |

EXAMPLE 2

|  | Capacity (Micro-microfarads per Square Inch) | Dissipation Factor, Percent (at 1 kc.—Room Temp.) | Breakdown Voltage (D.C.) |
|---|---|---|---|
| With Co-Operating Dielectric | 3,500 | 0.4 | 2,500 |
| Without Co-Operating Dielectric | 3,500 | 8.0 | 1,000 |

EXAMPLE 3

|  | Capacity (Micro-microfarads per Square Inch) | Dissipation Factor, Percent (at 1 kc.—Room Temp.) | Breakdown Voltage (D.C.) |
|---|---|---|---|
| With Co-Operating Dielectric | 90,000 | 0.3 | 115 |

Numerous other materials have been evaluated either experimentally or theoretically herein for use as co-operating dielectrics. For example, sulfur is considered desirable because of its high resistivity, high dielectric strength, high boiling point, and non-reactivity with aluminum. Anhydrous boron oxide may be used in the same way as sulfur. Boron oxide, which melts at about 475° C., has been found to substantially increase the breakdown potential of an aluminum oxide dielectric film. Because of the high processing temperature, boron oxide is particularly adaptable to tantalum oxide and niobium oxide dielectric films.

There are many plastic and organic materials which may be considered for co-operating dielectric use. Some examples are fluorocarbons, acrylics, cellulosic plastics, melamines, polyamides, phenolics, polyesters, chlorinated polyether, ureas, acetal, polystyrenes, various silicone compositions, etc.

As hereinbefore mentioned, the co-operating dielectric material may be introduced in gaseous form. Sulfur hexafluoride and nitrogen are two examples of excellent gases for purposes of this invention. By introducing the gas into a container which houses the oxide-filmed electrodes, and thereupon sealing the container to prevent escape, the gaseous dielectric will fill the interstices caused by imperfections in the oxide film. Thus, the gaseous medium remedies the imperfections in substantially the same manner as a solid or liquid co-operating dielectric material.

Dielectric materials of a liquid nature which are adaptable as co-operating dielectrics in the present invention are numerous. Some specific examples are enumerated as follows: hydrocarbon mineral oil; chlorinated diphenyls; low molecular weight polyisobutenes, low molecular weight polyisobutylenes, and liquid silicone compounds.

The oxide film capacitor of the present invention as hereinbefore described in two of its embodiments, is merely illustrative and not exhaustive in scope. Since many widely different embodiments of the invention may be made without departing from the scope thereof, it is intended that all matter contained in the above description and shown in the accompanying drawings shall be interposed as illustrative and not in a limiting sense.

What is claimed is:

1. In an electrical capacitor, a plurality of adjacent electrodes of high purity aluminum foil having substantially smooth surface finishes, said aluminum foil having a rigid dielectric oxide film formed thereupon, said oxide film being adapted to maintain physical separation between said electrodes, means to enhance the dielectric properties of said oxide film, said means comprising aryl-substituted silanes from the group consisting of Tetra-P-Biphenylylsilane, Diphenydi-P-Biphenylylsilane, Triphenyl-P-Biphenylylsilane, and Phenyltri-P-Biphenylylsilane, said aryl-substituted silanes being flowable during assembly and filling interstices throughout abutting surfaces of said oxide film while integrating with said film, and means for housing and electrically terminating said electrodes.

2. In an electrical capacitor, a plurality of adjacent electrodes of high purity aluminum foil having substantially smooth surface finishes, said aluminum foil having a rigid dielectric oxide film formed thereupon, said oxide film being adapted to maintain physical separation between said electrodes, means to enhance the dielectric properties of said oxide film, said means comprising a co-operating dielectric of cyanoethylated cellulose, said co-operating dielectric being flowable during assembly and filling interstices throughout abutting surfaces of said oxide film while integrating with said film, and means for housing and electrically terminating said electrodes.

References Cited by the Examiner

UNITED STATES PATENTS

| 1,751,213 | 3/1930 | McCulloch | 317—258 X |
| 2,497,066 | 2/1950 | Brennan | 317—258 X |
| 2,802,017 | 8/1957 | Frost et al. | 317—258 X |
| 3,144,371 | 8/1964 | Landolt | 317—258 X |

FOREIGN PATENTS

| 825,166 | 12/1959 | Great Britain. |

OTHER REFERENCES

Wilson, Simons and Brice, The Dielectric Strength of Gaseous Fluorocarbons, Journal of Applied Physics, vol. 21, March 1950.

LEWIS H. MYERS, *Primary Examiner.*

JOHN F. BURNS, ROBERT K. SCHAEFER, *Examiners.*

D. J. BADER, *Assistant Examiner.*